US012750506B2

(12) United States Patent
Xie et al.

(10) Patent No.: US 12,750,506 B2
(45) Date of Patent: Sep. 29, 2026

(54) BANDWIDTH-EFFICIENT LAYERED VIDEO CODING

(71) Applicant: GOOGLE LLC, Mountain View, CA (US)

(72) Inventors: Richard Xie, Cupertino, CA (US); Ramachandra Tahasildar, Cupertino, CA (US); Danny Hong, New York, NY (US); Jani Huoponen, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 86 days.

(21) Appl. No.: 18/684,430

(22) PCT Filed: Aug. 18, 2021

(86) PCT No.: PCT/US2021/046498
§ 371 (c)(1),
(2) Date: Feb. 16, 2024

(87) PCT Pub. No.: WO2023/022713
PCT Pub. Date: Feb. 23, 2023

(65) Prior Publication Data

US 2024/0388728 A1 Nov. 21, 2024

(51) Int. Cl.
*H04N 19/30* (2014.01)
*H04N 19/63* (2014.01)

(52) U.S. Cl.
CPC ............. *H04N 19/30* (2014.11); *H04N 19/63* (2014.11)

(58) Field of Classification Search
CPC ............................... H04N 19/30; H04N 19/63
See application file for complete search history.

(56) References Cited

U.S. PATENT DOCUMENTS

| | | | | |
|---|---|---|---|---|
| 8,243,789 | B2 * | 8/2012 | Demircin | H04N 19/34 375/240.06 |
| 8,855,198 | B2 * | 10/2014 | Kimoto | H04N 19/63 382/233 |
| 2006/0193388 | A1 | 8/2006 | Woods et al. | |
| 2015/0288965 | A1 * | 10/2015 | Li | H04N 19/124 375/240.03 |

(Continued)

OTHER PUBLICATIONS

International Preliminary Report on Patentability mailed Feb. 29, 2024 for PCT Application No. PCTUS2021/046498, 7 pages.

(Continued)

*Primary Examiner* — Jae N Noh

(57) ABSTRACT

An encoding operation is implemented to encode one or more frames, for example, gaming frames into a gaming stream. The encoding operation includes decomposing a current frame into a base layer and an enhancement layer. The resulting base layer and enhancement layer are then each encoded to produce an encoded base layer and an encoded enhancement layer. The encoded enhancement layer is truncated, for example, according to a comparison of the sum of the size of the encoded base layer and encoded enhancement layer to a threshold value. In an example embodiment, a multiplexer combines the encoded base layer and truncated enhancement layer to produce the encoded frame. The encoded frame may then be transmitted as part of a stream to a client device.

24 Claims, 9 Drawing Sheets

(56) References Cited

U.S. PATENT DOCUMENTS

2017/0155906 A1 6/2017 Puri

OTHER PUBLICATIONS

International Search Report and Written Opinion mailed May 13, 2022 for corresponding International Application No. PCT/US2021/046498, 12 pages.
Jerome M. Shapiro, "Embedded Image Coding Using Zerotrees of Wavelet Coefficients", IEEE Transactions on Signal Processing IEEE, USA, vol. 41, No. 12, Dec. 1, 1993, pp. 3445-3462.
Hong Man et al., "A Family of Efficient and Channel Error Resilient Wavelet/Subband Image Coders", IEEE Transactions on Circuits and Systems for Video Technology, IEEE, USA, vol. 9, No. 1, Feb. 1, 1999, 5 pp. 96-100.
Communication pursuant to Article 94(3) EPC mailed Apr. 17, 2026 for EP Application No. 21766790.6, 6 pages.

* cited by examiner

BANDWIDTH-EFFICIENT LAYERED VIDEO CODING

CROSS-REFERENCE TO RELATED APPLICATIONS

The present application is a U.S. National Stage under 35 U.S.C. § 371 of International Patent Application Serial No. PCT/US2021/046498, entitled "BANDWIDTH-EFFICIENT LAYERED VIDEO CODING" and filed on Aug. 18, 2021, the entirety of which is incorporated by reference herein.

BACKGROUND

The present disclosure relates generally to the field of video encoding and in particular to video encoding using a discrete wavelet transform.

Cloud-based gaming platforms involve executing portions of or entire videogame applications on remote servers to facilitate playing the video game application on a local client device. The remote servers provide audio and video rendered from executing video game applications as encoded audio and video streams over a network to the local client device. As such, the local client device only needs a screen and a device capable of playing a video stream in order to effectively run high-end, resource-intensive videogames. For the client device to display the high-quality graphics during gameplay, the remote servers transmit high-resolution high-frame-rate video requiring a large amount of network bandwidth, requiring the remote servers to encode and compress the video streams to reduce bandwidth without sacrificing video quality. One current approach to this requirement is to use a strict low-latency constant bitrate control scheme ("CBR"), which often results in a bitstream unnecessarily undershooting its target bitrate, under-utilizing the available bandwidth.

SUMMARY OF THE EMBODIMENTS

Techniques and systems described herein address the demands of providing bandwidth-efficient video streams from one or more servers to a client device while maintaining video quality. The proposed solution may, in particular, be implemented (without being limited to such an example implementation) in a cloud-based gaming system. A cloud-based gaming system includes a cloud-based or other remote server rendering a set of gaming frames that represents the visual content of a video game instance being executed at that server or a related server. The server encodes each gaming frame of the set of gaming frames using an encoding process described herein to generate a bitstream representing a stream of encoded rendered game frames for transmission to one or more client devices via one or more networks. In particular, such techniques and systems described herein allow for encoding frames at a server using an encoding operation that decomposes a frame into a base layer and enhancement layer. The operation also includes encoding the resulting base layer to produce an encoded base layer and generating a progressive stream from the resulting enhancement layer. For example, generating a progressive stream from the enhancement layer results from performing a zeroblock-based encoding on the enhancement layer to produce a progressive stream that represents one or more refinements to the resulting base layer. To limit the bandwidth of a resulting stream, the operation includes combining the encoded base layer and encoded enhancement layer so that the combined sum of respective sizes of the two layers is below a threshold size. By using this, for example wavelet-driven, encoding operation, the server may reduce the bandwidth needed to transmit any resulting stream while maintaining visually important directional edge info to optimize perceived video quality.

According to one example embodiment, a method can include decomposing a first frame into a base layer of the first frame and an enhancement layer of the first frame. The method can also include encoding the base layer at a target base layer bitrate based on a target bitrate to produce an encoded base layer and generating a progressive stream from the enhancement layer. Additionally, the method further includes truncating the progressive stream based on the target bitrate to produce a truncated progressive stream and combining the encoded base layer with the truncated progressive stream to produce an encoded first frame.

Truncating the progressive stream can include determining a sum of a size of the encoded base layer and a size of the progressive stream and comparing the sum to a ratio of the target bitrate to a frame rate of the first frame. Additionally, the method can include truncating the progressive stream in response to the sum being greater than the ratio. In an example embodiment, a multiplexer may truncate the encoded enhancement layer to decrease the size of the resulting encoded first frame. In doing so, the amount of bandwidth needed to transmit an encoded set of frames to a client system may be reduced while maintaining visually important details from the enhancement layer.

For example, a proposed encoding operation may be implemented to encode one or more gaming frames into a gaming stream. The encoding operation may then include decomposing a current frame into the base layer and the enhancement layer. The resulting base layer and enhancement layer are then each encoded to produce an encoded base layer and an encoded enhancement layer. The encoded enhancement layer is truncated, for example, according to a comparison of the sum of the size of the encoded base layer and the size of the encoded enhancement layer to a threshold value. In an example embodiment, a multiplexer combines the encoded base layer and truncated enhancement layer to produce the encoded first frame. The encoded first frame may then be transmitted as part of a stream to a client device.

Generally, generating the progressive stream can include encoding the enhancement layer by a zeroblock-based encoder. Additionally, in general, decomposing the first frame into the base layer and the enhancement layer can include applying a discrete wavelet transform to the first frame. Applying the wavelet transform can include decomposing the image into a plurality of sub-bands, wherein a first subset of the plurality of sub-bands forms the base layer of the first frame and a second subset of the plurality of sub-bands forms the enhancement layer of the first frame. A first subset of the plurality of sub-bands can include at least one sub-band defined by a first lower boundary and second upper boundary. The second subset of the plurality of sub-bands can include two or more partial sub-bands of different levels, for example in each case differing from and being higher than the boundaries of the first sub-band. In an example embodiment, the boundaries of the at least two or more partial sub-bands of the second subset may relate to consecutive parts of the second sub-band so that for example a first partial sub-band covers a first range and at least one second partial sub-band covers a second range higher than the first range (e.g., resulting from passing a frame through different low-pass and high-pass filters). In an example embodiment, at least three partial sub-bands relating to a least three different ranges, such as at least a (partial) low-high sub-band, (partial) high-low sub-band, and (partial) high-high sub-band. This may include a first subset of the plurality of sub-bands including at least a low-low sub-band and the second subset of the plurality of sub-bands includes at least a low-high sub-band, high-low sub-band, and high-high sub-band.

In another example embodiment, a method includes receiving a first frame of a set of frames and decomposing the first frame into a plurality of sub-bands. The plurality of sub-bands can include a base layer and an enhancement layer. The method can additionally include encoding the base layer at a base layer target bitrate based on a target bitrate so as to produce an encoded base layer and encoding the enhancement layer so as to produce an encoded enhancement layer. The method can also include comparing a sum of the encoded base layer and the encoded enhancement layer to a ratio of a target bitrate to a framerate of the set of frames and truncating the encoded enhancement layer as a function of comparing the sum to the ratio so as to produce a truncated enhancement layer. The method may also further include combining the encoded base layer with the truncated enhancement layer so as to produce an encoded first frame.

In general, the enhancement layer may be encoded by a zeroblock-based encoder. Further, generally, the plurality of sub-bands can include at least a low-low sub-band, low-high sub-band, high-low sub-band, and high-high sub-band with the low-low sub-band can forming the base layer and the low-high, high-low, and high-high sub-bands forming the enhancement layer. Additionally, in general, decomposing the first frame includes applying a discrete wavelet transform to the first frame.

Generally, methods herein can include converting the first frame from a first color space to a second color space. The first color space can comprise RBG and the second color space can comprise YUV. Methods herein may also include determining the target bitrate according to a variable-bitrate-control scheme or determining the target bitrate according to a constant-bitrate-control scheme. Methods herein additionally can include transmitting a stream to a client device, the stream including the encoded first frame. Methods can also include decoding the encoded first frame.

In general, the enhancement layer may include data relating to one or more of horizontal edges, vertical edges, or diagonal edges of the frame.

According to another example embodiment, a method includes receiving a bitstream and separating an encoded base layer and an encoded enhancement layer from the bitstream. The method can also include decoding the encoded base layer so as to produce a decoded base layer and decoding the encoded enhancement layer according to a zeroblock-based decoder so as to produce a decoded enhancement layer. Additionally, the method can include reconstructing an image as a function of the decoded base layer and the decoded enhancement layer.

The image can include a YUV colorspace scheme.

Additionally, the method may include converting the image from the YUV colorspace scheme to an RGB colorspace scheme; and displaying the image in the RGB colorspace scheme.

According to example embodiments, a system can include one or more processors and a memory coupled to the one or more processors and storing executable instructions configured to manipulate the one or more processors to perform the methods disclosed herein.

According to additional example embodiments, a system can include a network interface couplable to a network and an encoder coupled to the network interface, the system configured to perform the methods disclosed herein.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3-1 is a flow diagram illustrating a discrete wavelet transform, in accordance with some embodiments.

FIG. 3-2 is a flow diagram illustrating the decomposition of a game frame using a discrete wavelet transform at a first level, in accordance with some embodiments.

FIG. 3-3 is a flow diagram illustrating the decomposition of a game frame using a discrete wavelet transform at a second level, in accordance with some embodiments.

DETAILED DESCRIPTION

To facilitate understanding, the techniques of the present disclosure are described in the example context of a cloud-based gaming system in which a cloud-based or other remote server renderings a stream of video frames representing the visual content of a video game instance being executed at that server or a related server, and then encodes each frame using a wavelet-driven encoding process described herein to generate a bitstream representing a stream of encoded rendered game frames for transmission to one or more client devices via one or more networks. However, it will be appreciated that the systems and techniques described herein are not limited to this example context, but instead may be implemented in any of a variety of video stream encoding/decoding systems using the guidelines provided herein.

Figure 1:
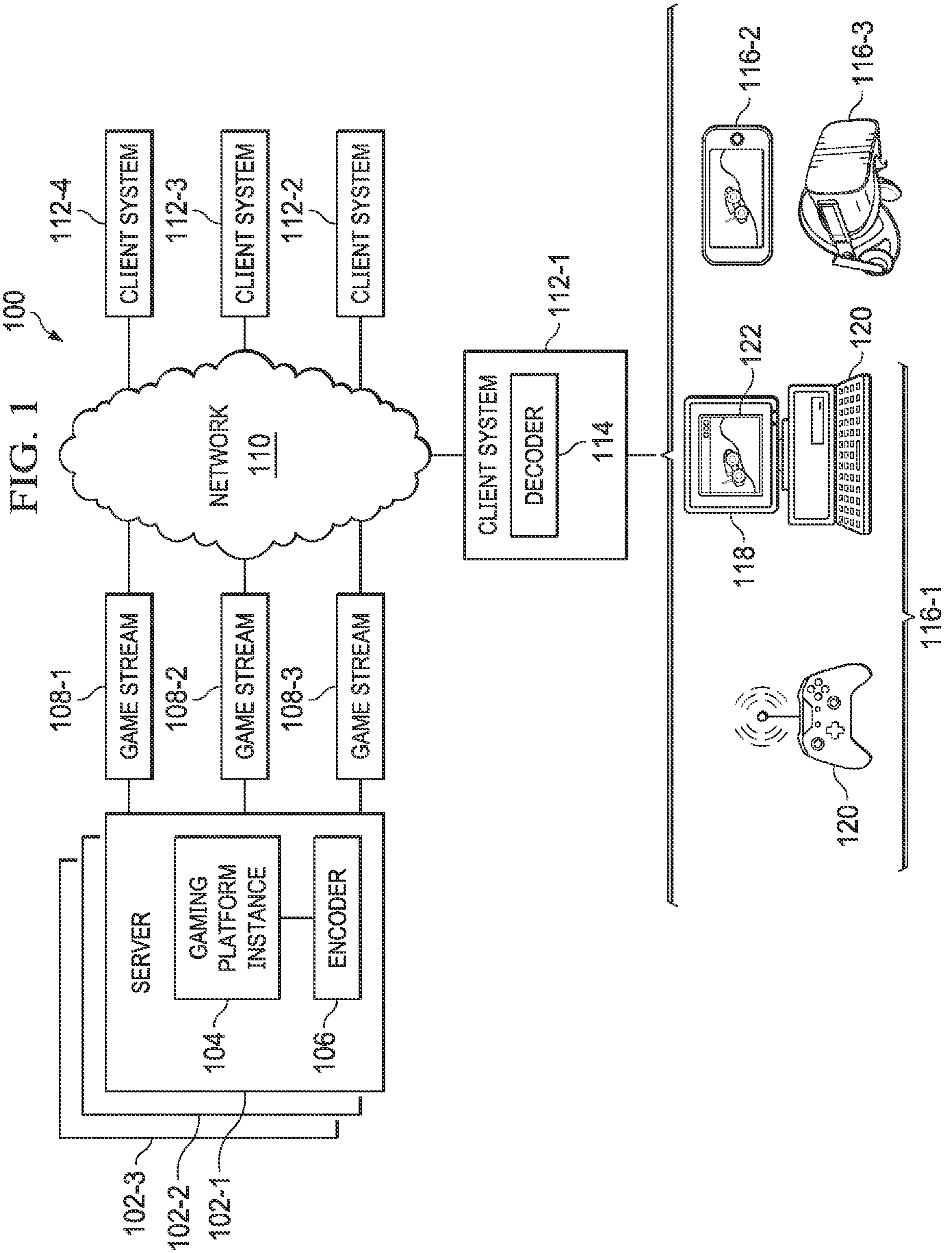
FIG. 1 is a block diagram of a cloud-based gaming system employing a wavelet-driven encoding technique, in accordance with some embodiments.

FIG. 1 illustrates a cloud-based gaming system 100 for single-player and multiplayer (including massively multiplayer) gaming, according to some embodiments. Cloud-based gaming system 100 includes one or more servers 102, with each server 102 communicatively coupled to one or more client systems 112 by at least one network 110. Network 110 is configured to allow for the transmission and reception of data between any of servers 102 and client systems 112 and includes, for example, wired and wireless networks, such as Ethernet, the Internet, Wi-Fi, or any combination thereof. In embodiments, each server 102 is communicatively interconnected via a high-bandwidth, low-latency inter-server messaging bus. Servers 102 are typically distributed in one or more data centers over a geographical area so as to reduce transmission latency through physical proximity. Though in the illustrated embodiment of FIG. 1, three servers 102-1, 102-2, and 102-3 are presented supporting four client systems 112-1, 112-2, 112-3, and 112-4, in other embodiments, any number of servers may be implemented supporting any number of client systems. It will be appreciated that in a typical real-world implementation, the quantity of servers 102 and quantity of client systems 112 typically will be considerably higher than presented in the example of FIG. 1.

In the depicted embodiment, each server 102 includes a computing device such as, for example, a cloud server, virtual server, or any combination is configured to support one or more client gaming sessions executed on one or more client systems 112. A "client gaming session", as used herein, includes a gaming application being played, partially simulated, or fully simulated on client system 112. Each server 102 is configured to support this client gaming session by executing a corresponding game platform instance 104 that facilitates the execution of at least a portion of the gaming application being played, partially simulated, or fully simulated on the client system 112. Such facilitation can include performing one or more operations related to the gaming application, such as, for example, rendering one or more frames related to the gaming application, performing calculations related to the gaming application (e.g., lighting calculations, artificial intelligence calculation, physics calculations, shading calculations, input calculations, and the like), providing access to files, or any combination thereof, to name a few. The game platform instance 104 provides various software and hardware resources to achieve such facilitation, such as communication/network management, resource management, media rendering encoding, and the like. In this way, game platform instance 104 simulates the execution of one or more operations of gaming application for a corresponding player as though that gaming application was being played on a local gaming device, such as a personal computer ("PC"), game console, smartphone, tablet computer, automotive entertainment system, and the like.

Each client system 112 represents the hardware and software resources utilized to receive player input through manipulation of one or more input/output devices for at least one player, as well as to present the video and audio content representing the visual and auditory content, respectively, of the gameplay for the at least one player. Examples of a client system 112 include one or more desktop computers, notebook computers, tablet computers, virtual-reality systems, augmented reality systems, a compute-enabled cellular phone (i.e., a "smartphone"), a compute-enabled television (i.e., a "smart TV"), or any combination thereof, to name a few. As illustrated with reference to client system 112-1, each client system 112 includes one or more client devices 116. In the illustrated embodiment, client system 112-1 comprises a first client device 116-1, which is communicatively coupled to, or otherwise associated with, display 118, at least one input device 120 (e.g. a gamepad, joystick, keyboard, mouse, touchscreen), one or more network interfaces configured to couple to the network connecting the client system 112 to a corresponding server 102, one or more processors, memory, storage, speakers, and other computing resources to render, process, and display scenes of a virtual environment. As illustrated with reference to client system 112-1, each client system 112 can include a decoder 114 configured to decode one or more frames related to a virtual environment. Decoder 114 can include hardware and software configured to decode one or more encoding streams (e.g., game streams 108) received from servers 102 so as to produce a decoded set of frames or decoded stream. In embodiments, client system 112-1 further comprises a smartphone client device 116-2, and a wearable virtual reality client device 116-3, each of which may operate as an integrated mobile computing device having input facilities, output facilities, display facilities, and communication facilities analogous to those noted above with respect to client device 116-1. In certain embodiments, client devices 116-1, 116-2, and 116-3 may include one or more facilities such as accelerometers, Global Positioning System (GPS) devices, and the like that are used to acquire motion data representing movement of the client device, as well as a rate or acceleration of such movement.

While certain aspects described herein will be discussed with specific reference to cloud gaming scenarios, it will be appreciated that in certain embodiments the described techniques may be utilized in various non-gaming scenarios, such as if one or more of servers 102 and client systems 112 operate to render, process, and display other types of informational, educational, recreational and/or artistic content. It will therefore be further appreciated that while techniques are discussed herein with respect to the rendering of content that may utilize particular examples relevant to cloud gaming and gaming content, such discussions and techniques may be applied to such non-gaming scenarios. Examples provided herein may refer to scenarios involving the rendering, processing, and display of gaming content due to particular bandwidth and network latency issues relevant to such content and should not be construed to indicate that the techniques described are limited to those scenarios.

During operation, each server 102 executes a gaming platform instance 104 for one or more client gaming sessions. Executing game platform instance 104 includes rendering a set of frames that includes one or more gaming frames associated with the gaming application being executed on one or more respective client systems 112. Each rendered gaming frame depicts at least a portion of a virtual environment used in the gaming application executed on the client system 112. For example, each rendered gaming frame can depict at least a portion of a virtual environment displayed on a display 118 of a client device 116 during the client gaming session.

Each server 102 is configured to encode each rendered gaming frame via encoder 106 so as to generate a respective encoded set of frames (also referred to herein as "game stream" 108). Each server 102 is configured to encode a game stream 108 through, for example, compression, reorganization, and manipulation of each frame rendered by gaming platform instance 104. In embodiments, each encoder 106 of a server 102 implements one or more codecs so as to encode one or more rendered frames according to the one or more codecs. Such codecs can include, H. 264, H. 265, VP9, AV1, or any combination thereof, to name a few. According to embodiments, each server 102 is configured to encode a set of frames to produce a game stream 108 using a wavelet-driven encoding process, such as by decomposing one or more frames of a set of frames into a respective base layer and enhancement later, encoding the resulting base layer and enhancement layer, and combining the encoded base layer and enhancement layer according to a threshold value. Each resulting game stream 108 corresponds to a gaming application being executed on one or more client systems 112 and is provided to these corresponding client systems via network 110. The corresponding client systems 112 are each configured to decode a received game stream 108 via a decoder 114 and display the resulting decoded set of frames 122 on, for example, a display 118. Each client system 112 is configured to decode a respective game stream 108 by compression, reorganization, and manipulation of the frames within the encoded stream according to one or more various video codecs including lossless and lossy codecs. According to embodiments, each client system 112 includes a decoder that implements one or more codecs so as to decode a received game stream 108 according to the one or more codecs. Such codecs can include, H. 264, H. 265, VP9, AV1, or any combination thereof, to name a few. Though three game streams 108-1, 108-2, 108-3 are depicted in the illustrated embodiment, in other embodiments, servers 102 can generate any number of game streams 108 each corresponding to one or more client gaming sessions.

Figure 2:
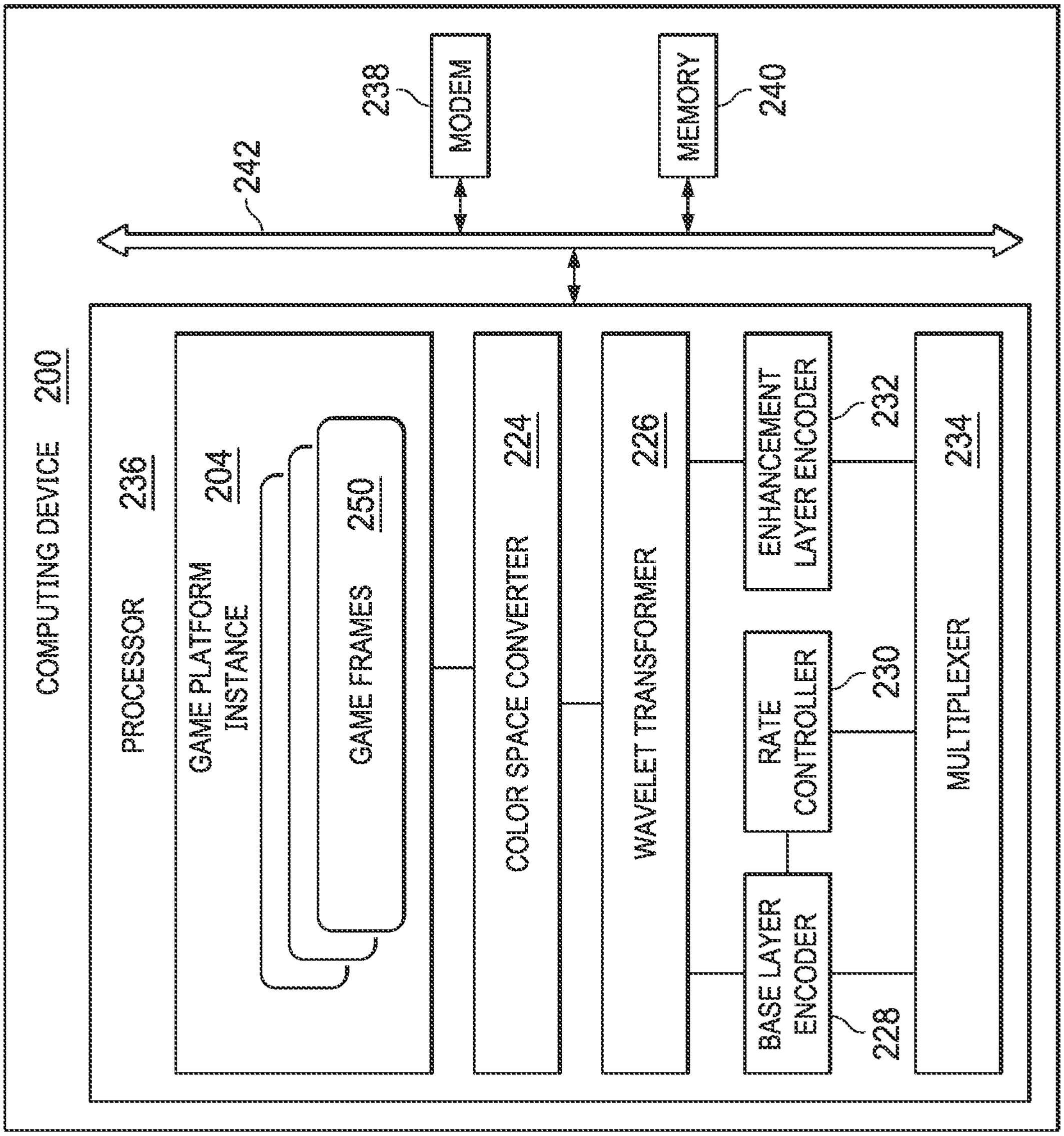
FIG. 2 is a block diagram of a computing device configured to encode and stream frames within a cloud-based gaming system, in accordance with some embodiments.

Referring now to FIG. 2, a computing device 200 configured to encode and stream frames within a cloud-based gaming system is illustrated. In embodiments, computing device 200 implements aspects of cloud-based gaming system 100 as described in FIG. 1. For example, computing device 200 may be similar or the same as a server 102 described in FIG. 1. Computing device 200 includes one or more software and hardware components for bi-directional communications including components for encoding a set of game frames 250 such as to produce a game stream 108. In some embodiments, computing device 200 is part of an electronic device that supports encoding of a set of game frames 250, including, for example, a desktop computer, a notebook computer, a tablet, a server, a game console, to name a few. In embodiments, computing device 200 includes processor 236, modem 238, and memory 240. Memory 240 includes an electronic storage device, such as for example, a solid-state drive, a hard disk drive, random access memory ("RAM"), read-only memory ("ROM"), electronically erasable programmable ROM ("EEPROM"), optical storage device, or any combination thereof. Memory 240 includes instructions and data related to the operation of game platform instance 204, color space converter 224, wavelet transformer 226, base layer encoder 228, rate controller 230, enhancement layer encoder 232, and multiplexer 234 such as, for example, codecs, coefficients, operations, reference frames, gaming engines, gaming applications, constants, and the like. Modem 238 is configured to be communicatively coupled to one or more client systems 112 via a network 110 and further configured to transmit a game stream 108 to the one or more client systems 112. According to embodiments, processor 236, modem 238, and memory 240 are internally in electronic communication via one or more interfaces (e.g., a bus 242).

According to embodiments, processor 236 includes one or more computer processing units ("CPUs"), microprocessors, field-programmable gate arrays ("FPGAs"), graphics processing units ("GPUs"), application-specific integrated circuits ("ASICs"), or any combination thereof and is configured to render and encode gaming frames for use in a client gaming session on cloud-based gaming system 100. Processor 236 operates to execute a game platform instance 204, the same or similar as game platform instance 104, associated with a current client gaming session and configured to support a gaming application executed on one or more client systems. Game platform instance 204 includes graphics hardware and software (not shown for clarity) to render a set of game frames 250 associated with a virtual environment of the gaming application executed on the one or more client systems. Such graphics hardware and software include, for example, graphics cores, processing cores, pixel shaders, video random access memory (VRAM), GPUS, physics engines, lighting engines, tessellation engines, and the like. Each rendered game frame of the set of game frames 250 represents at least a portion of a virtual environment associated with the gaming application executed on the client system.

Portions of the virtual environment include, for example, interactive and noninteractive assets such as backgrounds, environments, characters, textures, items, heads-up displays ("HUDs"), animations, and the like. For example, if the gaming application is a racing game, each game frame of the set of game frames 250 represents at least a portion of a racetrack, car, or surrounding area.

According to embodiments, each rendered game frame of the set of game frames 250 has a first color space, or color model, such as, for example, RGB, BGR, GBR, YCbCr, YUV, HSV, HSL, LCh, and CMYK, to name a few. In embodiments, each rendered frame of the set of game frames 250 is provided to color space converter 224 which includes hardware and software configured to convert the color space, or color model, of the rendered frame from a first color space to a second, different color space. As an example, color space converter 224 is configured to convert a current game frame from an RGB color space to a YUV color space. Color space converter 224 includes such hardware and software as, for example, FPGAs, microcontrollers, ASICs, GPUs, and the like.

Figures 1, 3:
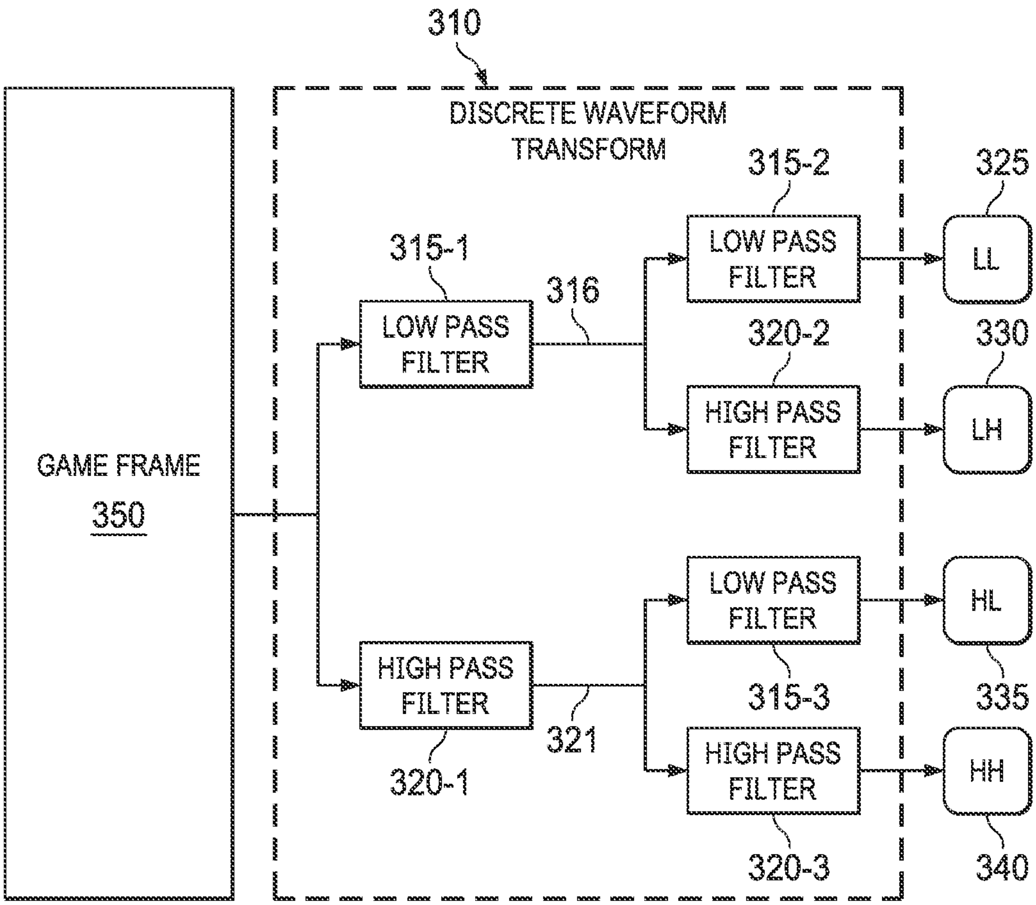
Figures 2, 3:
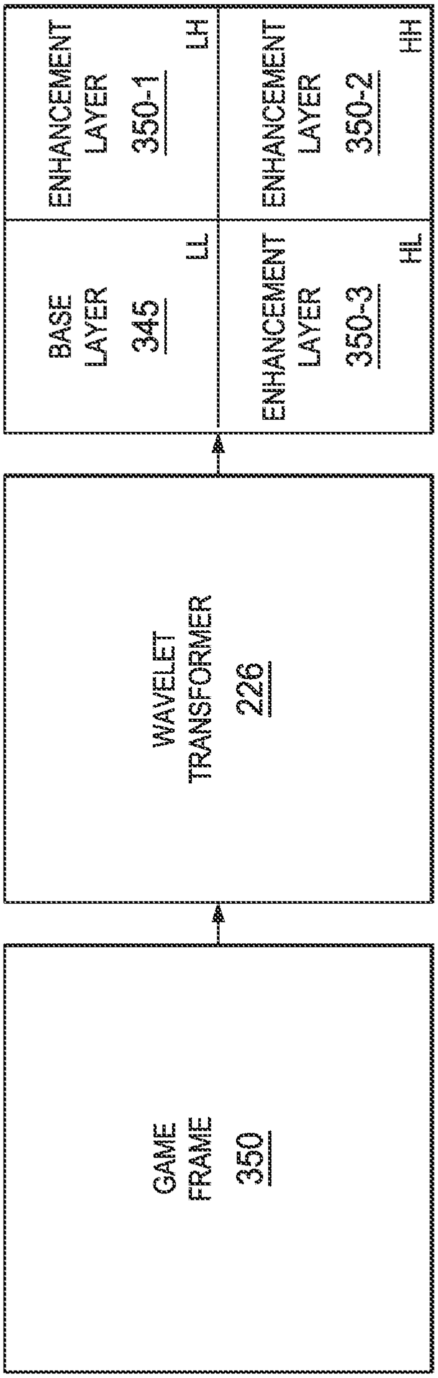
Figure 3:
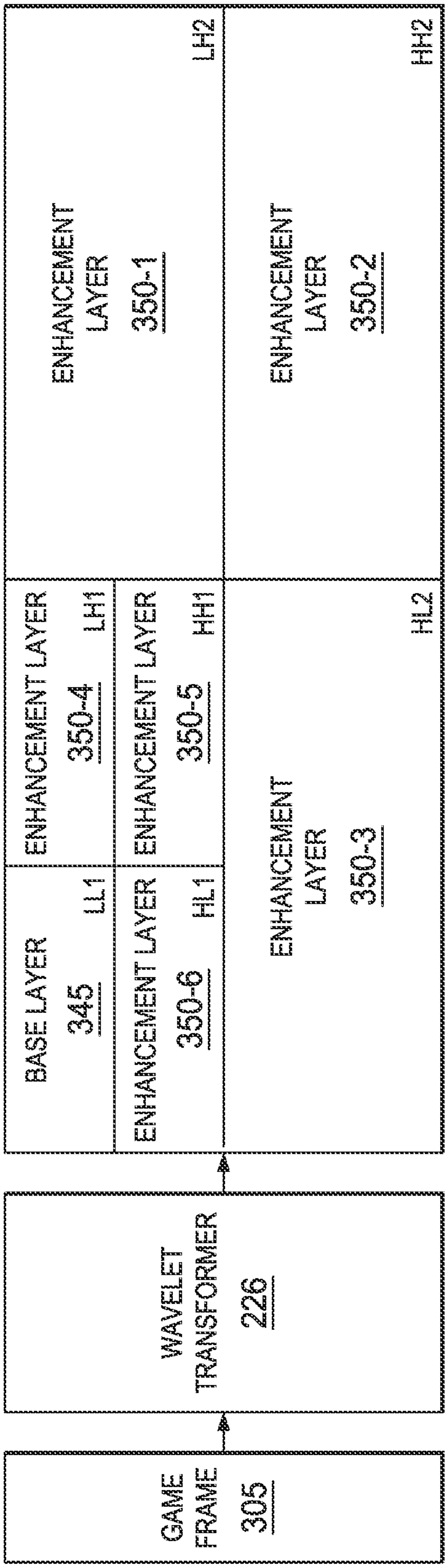

Processor 236 also includes a wavelet transformer 226 including hardware and software configured to decompose a current frame into a plurality of sub-bands with each sub-band of the plurality of sub-bands representing one or more frequency bands associated with the frame. According to embodiments, wavelet transformer 226 is configured to perform a discrete wavelet transform on a game frame 305 which includes passing the game frame 305 through a series of one or more low pass filters and one or more high-pass filters to generate one or more sub-bands. Referring now to FIG. 3-1, an example discrete waveform transform performed by the wavelet transform 226 is presented. In the example embodiment, the wavelet transformer 226 performs a discrete wavelet transform 310 on game frame 305 which includes passing game frame 305 through low pass filters 315-1, 315-2, and 315-3 and high pass filters 320-1, 320-2, and 320-3. The wavelet transformer 226 first passes each row of game frame 305 through low pass filter 315-1, resulting in signal 316, and through high pass filter 320-1, resulting in signal 321. In embodiments, resulting signals 316 and 321 each includes one or more coefficients each representative of a brightness of one or more areas or game frame 305 with signal 316 including coefficients for frequencies under a predetermined threshold value associated with low pass filter 315-1 and signal 320 including coefficients for frequencies above a predetermined threshold value associated with high pass filter 320-1. According to embodiments, the wavelet transformer 226 downsamples resulting signals 316, 321 such as, for example, by a factor of two. The wavelet transformer 226 is further configured to pass the resulting signal 316 through low pass filter 315-2 and high pass filter 320-2, resulting in a partial sub-band, namely low-low ("LL") sub-band 325 including coefficients for frequencies below the predetermined threshold values associated with low pass filters 315-1, 315-2, and another partial sub-band, namely low-high ("LH") sub-band 330, including coefficients for frequencies below the predetermined threshold value associated with low pass filter 315-1 and above the predetermined threshold value associated with high pass filter 320-2. Likewise, the wavelet transformer 226 passes signal 321 through low pass filter 315-3 and high-pass filter 320-3, resulting in high-low ("HL") band 335, including coefficients for frequencies above the predetermined threshold value associated with high pass filter 320-1 and below the predetermined threshold value associated with low pass filter 315-3, and high-high ("HH") band 340, including coefficients for frequencies above the predetermined threshold values associated with high pass filters 320-1 and 320-3.

Wavelet transformer 226 is further configured to decompose a game frame into a base layer and an enhancement layer at multiple levels. FIGS. 3-2 and 3-3 each illustrate respective examples of decomposing a game frame 305 into a plurality of sub-bands at different levels, with FIG. 3-2 illustrating decomposing game frame 305 at one level and FIG. 3-3 illustrating decomposing game frame 305 at two levels. In embodiments, wavelet transformer 226 groups one or more resulting sub-bands together to form one or more layers of a frame, so as to decompose the frame into a base layer and an enhancement layer. For example, in the illustrated embodiment of FIG. 3-2, the LL sub-band forms base layer 345 of game frame 305 and the LH sub-band 350-1, HL sub-band 350-3, and HH sub-band 350-2 form enhancement layer 350 of game frame 305. In embodiments, a base layer 345 provides a basic quality level of the frame at a low bit rate and an enhancement layer 350 provides successive refinement to the detail of a base layer. For example, an enhancement layer 350 includes data relating to a frame such as horizontal edges, vertical edges, or diagonal edges of the frame. According to embodiments, wavelet transformer 226 can decompose each game frame 305 at an N number of levels by further decomposing a resulting LL sub-band into respective LL, LH, HL, and HH sub-bands an N−1 number of times. For example, in the illustrative embodiment of FIG. 3-3, wavelet transformer 226 decomposes game frame 305 at two levels. At a first level of decomposition, wavelet transformer 226 decomposes game frame 305 into a first set of sub-bands LL2, LH2 350-1, HL2 350-3, and HH2 350-2. At a second level of decomposition, wavelet transformer 226 further decomposes LL2 into a second set of sub-bands LL1 345, LH1 350-4, HL1 350-6, and HH1 350-5.

Referring again to FIG. 2, processor 236 further includes a base layer encoder 228 including hardware and software configured to encode a base layer decomposed from the current frame to produce an encoded base layer. Base layer encoder 228 includes one or more software and/or hardware encoders configured to encode a base layer according to, for example, one or more interframe and intraframe techniques. According to some embodiments, base layer encoder 228 is configured to encode each decomposed base layer using a constant bitrate scheme while in other embodiments, base layer encoder 228 is configured to encode each decomposed base layer according to a rate control scheme. The rate control scheme sets a quantization parameter for each base layer to be encoded by a given base layer encoder 228 so that the size of each encoded base layer matches a target size determined from a target base layer bitrate. The rate control scheme is implemented by rate controller 230 which includes one or more processors, hard-coded logic, programmable logic, or any combination thereof configured to set the bitrate and a number of respective bits (i.e., degree of compression) at which to encode a current base layer. In embodiments, rate controller 230 determines the target bitrate for encoding each base layer according to the equation:

$$TB_{Current} = TB_{Stream} * \alpha \qquad \text{[EQ1]}$$

wherein $TB_{current}$ represents the target bitrate for the current base layer (also referred to herein as a "target base layer bitrate"), $TB_{stream}$ represents the predetermined target bitrate for game stream 108, and a represents a constant corresponding to the number of levels at which the current frame was decomposed to result in the current base layer. For example, if a current frame was decomposed at one level, α is be set at 0.8 and if a current frame was decomposed at two levels, α is set at 0.6.

Processor 236 likewise includes enhancement layer encoder 232 including hardware and software configured to encode an enhancement layer decomposed from the current frame to produce an encoded enhancement layer. According to embodiments, enhancement layer encoder 232 is distinct from base layer encoder 228 and operates concurrently with base layer encoder 228. In embodiments, enhancement layer encoder 232 includes a progressive zeroblock-based encoder configured to compress a decomposed enhancement layer to produce an encoded enhancement layer or progressive stream. That is to say, the progressive zeroblock-based encoder encodes the enhancement layer into an encoded bitstream representing one or more refinements to the base layer decomposed from the current frame (i.e., a "progressive stream".) The progressive zeroblock-based encoder is configured to determine if one or more blocks of an enhancement layer are "zero blocks". That is to say, the progressive zeroblock-based encoder is configured to determine if one or more blocks of an enhancement layer are substantially similar to respective, adjacent blocks of the enhancement layer. According to embodiments, the progressive zeroblock-based encoder is configured to determine one or more zero blocks by sorting the coefficients of the enhancement layer by significance such as into sets of a first type of coefficients, e.g., "significant" coefficients, and a second type of coefficients, e.g., "insignificant" coefficients, and flagging blocks with coefficients of the second type (i.e., insignificant coefficients) as zero blocks. The progressive zeroblock-based encoder is configured to compress the identified zero blocks so that the quantized coefficients of the encoded zero blocks are all zero. In this way, the progressive zeroblock-based encoder encodes an encoded layer that includes one or more successive refinements to the detail of a base layer into a progressive stream (i.e., an encoded bitstream representing one or more refinements to the base layer decomposed from the current frame).

In embodiments, processor 236 includes multiplexer 234 configured to combine an encoded base layer and an encoded enhancement layer, or progressive stream, to generate an encoded game frame. According to embodiments, multiplexer 234 is configured to truncate an encoded enhancement layer, or progressive stream, based on a target bitrate for the game stream 108. Truncating the encoded enhancement layer can include determining the size of a sum of the encoded base layer and the encoded enhancement layer and comparing this sum to a threshold value. In embodiments, this threshold value can include a ratio of the target bitrate for the game stream 108 to the frame rate associated with the current frame. Based on this comparison, the encoded enhancement layer can be truncated so that the sum of the size of a sum of the encoded base layer and the encoded enhancement layer does not exceed the threshold value. In this way, the bandwidth of the resulting game stream 108 may be reduced while preserving visually important (i.e., significant) details of the frame, such as directional edge info.

Figure 4:
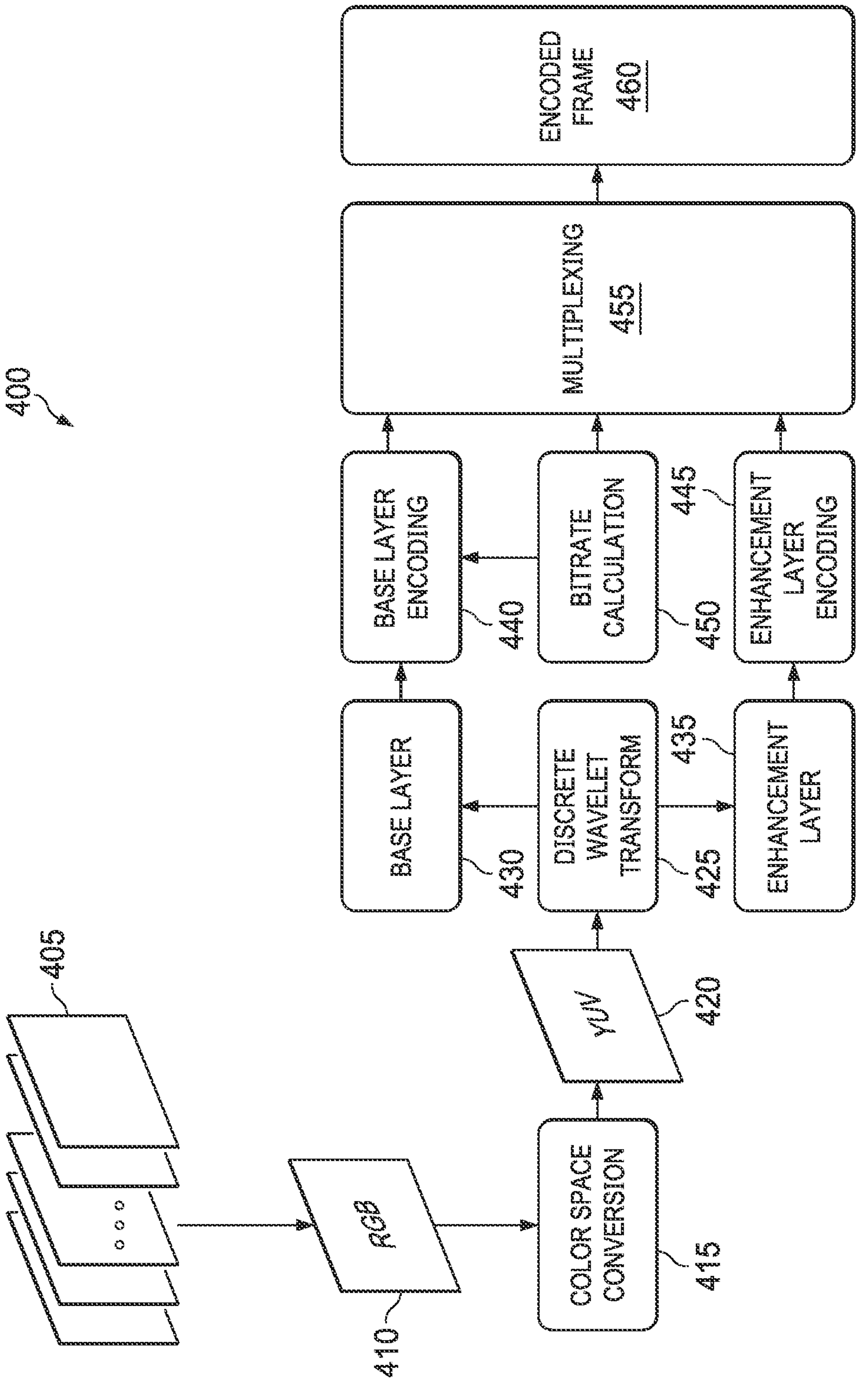
FIG. 4 is a flow diagram illustrating a method for a wavelet-driven encoding of a frame of a stream of frames, in accordance with some embodiments.

Referring now to FIG. 4, an example encoding operation 400 using a discrete wavelet transform for a wavelet-driven encoding technique is illustrated. For ease of illustration, the encoding operation 400 is described with reference to the computing device 200 of FIG. 2 implemented as a server 102 in the cloud-based gaming system 100 of FIG. 1. In operation 400, the game platform instance 204 renders a set of frames 405 for a client gaming session associated with a gaming application running on one or more client systems. Each frame of the set of frames 405 represents at least a portion of a virtual environment related to the gaming application. To facilitate transmission of the set of frames 405 to the client system executing the gaming application, wavelet transformer 226 performs a discrete wavelet transform 425 on each frame of the set of frames 405 to decompose the frames into respective base layers 430 and enhancement layers 435. Before multiplexer 234 combines together these respective base layers 430 and enhancement layers 435 to produce the encoded frame 460, the multiplexer 234 truncates the encoded enhancement layer to decrease the size of the resulting encoded frame. In doing so, the amount of bandwidth needed to transmit the encoded set of frames to the client system is reduced while maintaining visually important details from the enhancement layer.

In operation 400, a first frame 410 of the set of frames 405 includes a first color space, such as, for example, RGB. The encoding operation 400 includes color space converter 224 performing a color space conversion 415 on the first frame 410. The color space conversion 415 includes converting, or changing, the color space of the first frame 410 from a first color space to a second, different color space. In other words, the color space conversion 415 includes converting the first frame 410 having a first color space to generate a converted frame 420 having a second, different color space. For example, the color space conversion 415 includes converting the first frame 410 having an RGB color space to generate a converted frame 420 having YUV color space.

According to embodiments, the encoding operation 400 further includes wavelet transformer 226 performing a discrete wavelet transform 425, similar or the same as discrete wavelet transform 310, on the converted frame 420. The discrete wavelet transform 425 includes decomposing converted frame 420 into a resulting base layer 430 and resulting enhancement layer 435. The discrete wavelet transform 425 includes decomposing a frame at one or more levels into a plurality of sub-bands that form a base layer 430 and an enhancement layer 435. The resulting base layer 430 provides one or more coefficients representing a basic quality level of the converted frame 420 at a low bit rate and the resulting enhancement layer 435 provides successive refinement to the detail of the base layer 430. For example, enhancement layer 435 includes data representing, for example, horizontal edges, vertical edges, or diagonal edges of the converted frame 420.

In embodiments, the encoding operation 400 includes base layer encoder 228 performing a base layer encoding 440 on the resulting base layer 430 to produce an encoded base layer. The base layer encoding 430 includes compressing and encoding base layer 430 according to one or more encoding processes and codecs. In embodiments, base layer encoder 228 performs base layer encoding 430 according to a variable bitrate provided by, for example, a rate controller 230 configured to perform a bitrate calculation 450. The bitrate calculation 450 includes determining a bitrate at which to encode a resulting base layer 430 based upon the number of levels used in discrete wavelet transform 425 to decompose the converted frame 420 into base layer 430. For example, the bitrate calculation 450 includes determining a first bitrate to encode the base layer 430 in response to the converted frame 420 being decomposed at one level to produce base layer 430 and a second bitrate to encode the base layer 430 in response to the converted frame 420 being decomposed at two levels to produce base layer 430. According to embodiments, bitrate calculation 450 includes determining a target bitrate ($TB_{current}$) the same or similar as the process used by rate controller 230 discussed above with reference to FIG. 2.

Encoding operation 400 also includes enhancement layer encoder 232 performing an enhancement layer encoding 445 on the resulting enhancement layer 435 to produce an encoded enhancement layer, or progressive stream. In embodiments, encoding operation 400 includes base layer encoder 228 performing base layer encoding 440 on resulting base layer 430 and enhancement layer encoder 232 performing enhancement layer encoding 445 on resulting enhancement layer 435 concurrently. Enhancement layer encoding 445 includes identifying zero blocks in the resulting enhancement layer 445 by sorting the coefficients of the enhancement layer 445 into "significant bits" and "insignificant bits". According to embodiments, enhancement layer encoding 445 includes initializing a list of insignificant sets and a list of significant pixels. Initializing these lists includes populating the list of insignificant sets with the coefficients of the one or more LH, HL, and HH sub-bands that make up the enhancement layer 435 and emptying the list of significant pixels. In embodiments, each of the one or more LH, HL, and HH sub-bands represent a block, or a group of one or more pixels, of the enhancement layer 435. Enhancement layer encoding 445 further includes performing a sorting pass for each element within the list of insignificant sets. The sorting pass includes performing a significance test on each element within the list of insignificant sets, that is to say, the sorting pass includes performing a significance test on each sub-band that forms the enhancement layer 435. A significance test, as used herein, is one or more functions configured to determine the significance of one or more pixels of an enhancement layer by comparing the coefficients of the enhancement layer to a predetermined threshold value. For example, a significance test may be represented by the following function:

$$\Gamma_n(T) = \begin{cases} 1, & 2^n \leq \max_{C_{i,j}} \in T|C_{i,j}| < 2^{n+1} \\ 0, & \text{else} \end{cases} \qquad \text{[EQ 2]}$$

wherein $C_{i,j}$ represents the magnitude of the wavelet coefficient located at (i,j), T represents a set, or sub-band, in the list of insignificant sets, and $\Gamma_n(T)=1$ indicates that a set (T) is significant. According to embodiments, in response to a set being determined as significant, enhancement layer encoding 445 includes determining if the set represents a pixel or a block. In response to the set representing a pixel, the set is removed from the list of insignificant sets and is added to the list of significant pixels. In response to the set not representing a pixel, the set is then partitioned into one or more subsets and the significance test is then performed on the partitioned one or more subsets. In embodiments, pixels deemed to be insignificant (i.e., not significant) are compressed so that their quantized coefficients are all zero. In this way, enhancement layer encoding 435 produces an encoded enhancement layer. That is to say, enhancement layer encoding 435 produces an encoded bitstream representing one or more refinements to the resulting base layer 430 (i.e., progressive stream) from the resulting enhancement layer 435.

The encoding operation 400 further includes multiplexer 234 performing a multiplexing operation 455 which includes combining the encoded base layer and the encoded enhancement layer or progressive stream to produce an encoded frame 460. Multiplexing operating 455 includes truncating the encoded enhancement layer or progressive stream according to a target bitrate for a resulting game stream 108. In embodiments, rate controller 230 performs bitrate calculation 450 to determine the target bitrate. Rate controller 230 determines the target bitrate based on, for example, one or more predetermined values, codecs implemented by base layer encoder 228 and enhancement layer encoder 232, one or more other frames of set of frames 405, available bandwidth, or any combination thereof. In embodiments, multiplexing operation 455 includes determining a size, in bits, of the sum of the encoded base layer and the encoded enhancement layer, or progressive stream. Multiplexing operation 455 further includes comparing this sum to a ratio of the target bitrate for the stream to a frame rate associated with the set of frames 405. The frame rate associated with the set of frames 405 includes, for example, the rate at which the set of frames 405 was rendered, the rate at which the set of frames 405 are to be played back, the rate at which the set of frames 405 are to be streamed, or any combination thereof. In response to the sum being greater than the ratio of the target bitrate for the stream to a frame rate associated with the set of frames 405, the encoded enhancement layer is truncated such that the sum is equal to the ratio.

According to embodiment, processor 236 performs encoding operation 400 for each frame of the set of frames 405 resulting in a plurality of encoded frames. These encoded frames form a game stream 108 that is provided to one or more client systems over a network.

Figure 5:
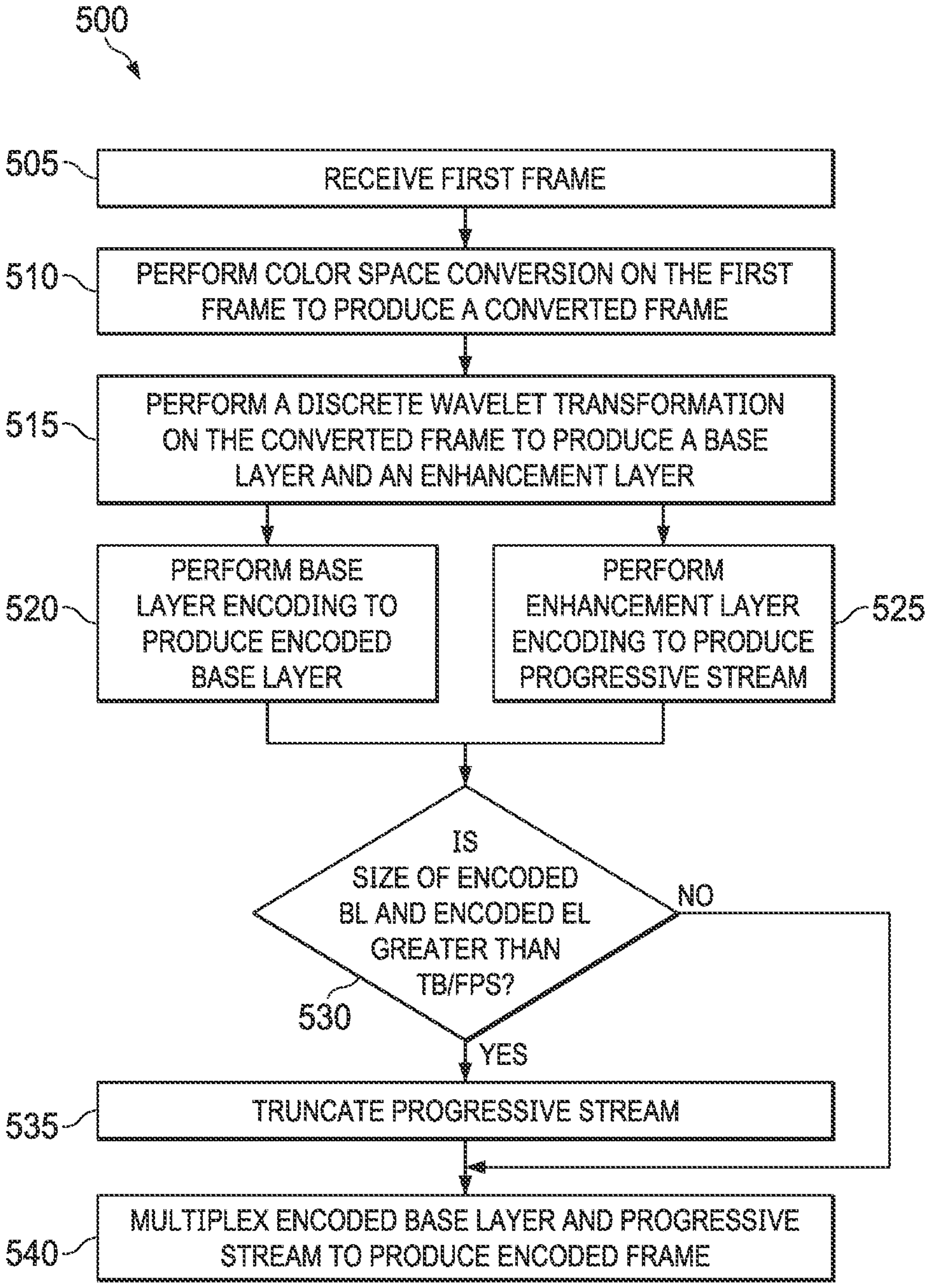
FIG. 5 is a diagram illustrating an example wavelet-driven encoding process, in accordance with some embodiments.

Referring now to FIG. 5, a method 500 for wavelet-driven encoding using a discrete wavelet transform is presented. For ease of illustration, the method 500 is described with reference to the computing device 200 of FIG. 2 implemented as a server 102 of the system 100 of FIG. 1. At block 505, a first frame from a set of frames is received by an encoder including color space converter 224, wavelet transformer 226, base layer encoder 228, rate controller 230, enhancement layer encoder 232, and multiplexer 234. The first frame includes data representing at least a portion of a virtual environment related to a gaming application associated with a current gaming session. The first frame further includes a first color space, such as, for example, RBG. At block 510, the color space converter 224 performs a color space conversion on the first frame. The color space conversion includes converting the color space of the first frame from a first color space to a second color space producing a converted frame. For example, the color space conversion includes converting the color space of the first frame from RBG to produce a converted frame having a color space of YUV. At block 515 the wavelet transformer 226 performs a discrete wavelet transform on the converted frame. The discrete wavelet transform includes decomposing the converted frame into a plurality of sub-bands at one or more levels. Each sub-band represents one or more frequencies of the frame and includes coefficients representing the brightness of one or more areas of the frame. For example, the discrete waveform transform includes decomposing the converted frame into one or more LL, LH, HL, and HH sub-bands each including one or more coefficients. Subsets of the resulting sub-bands are grouped together to form a base layer of the first frame and an enhancement layer of the first frame. For example, a resulting LL sub-band forms the base layer of the first frame and the resulting LH, HL, and HH sub-bands form the enhancement layer of the first frame. At block 520, base layer encoder 228 performs a base layer encoding on the base layer of the first frame to produce an encoded base layer. The base layer encoding can include rate controller 230 determining a target base layer bitrate based upon the number of layers used to decompose the first frame. At block 525, the enhancement layer encoder performs an enhancement layer encoding on the enhancement layer of the first frame to produce an encoded enhancement layer or progressive stream. The enhancement layer encoding operation includes a progressive zeroblock-based encoding operation as discussed above with reference to FIG. 4. According to embodiments, method 500 includes performing blocks 520 and 525 concurrently.

At block 530, multiplexer 234 determines a size of the sum of the encoded base layer and encoded enhancement layer. Multiplexer 234 compares this determined size to a ratio of a target bitrate for a resulting game stream 108 and a frame rate associated with the first frame. In response to the size being greater than the ratio, the system moves to block 535 and in response to the size not greater than the ratio, the system moves to block 540. At block 535, multiplexer 234 truncates the encoded enhancement layer, or progressive stream, so that the sum of the encoded base layer and the encoded enhancement layer is equal to the ratio of a target bitrate for a resulting game stream and a frame rate associated with the first frame. At block 540, multiplexer 234 combines the encoded base layer and encoded enhancement layer, or truncated enhancement layer, to produce an encoded frame. In embodiments, processor 236 is configured to perform method 500 for each frame of a set of frames producing a stream of frames, or game stream, that is provided to one or more client systems associated with the gaming session.

Figure 6:
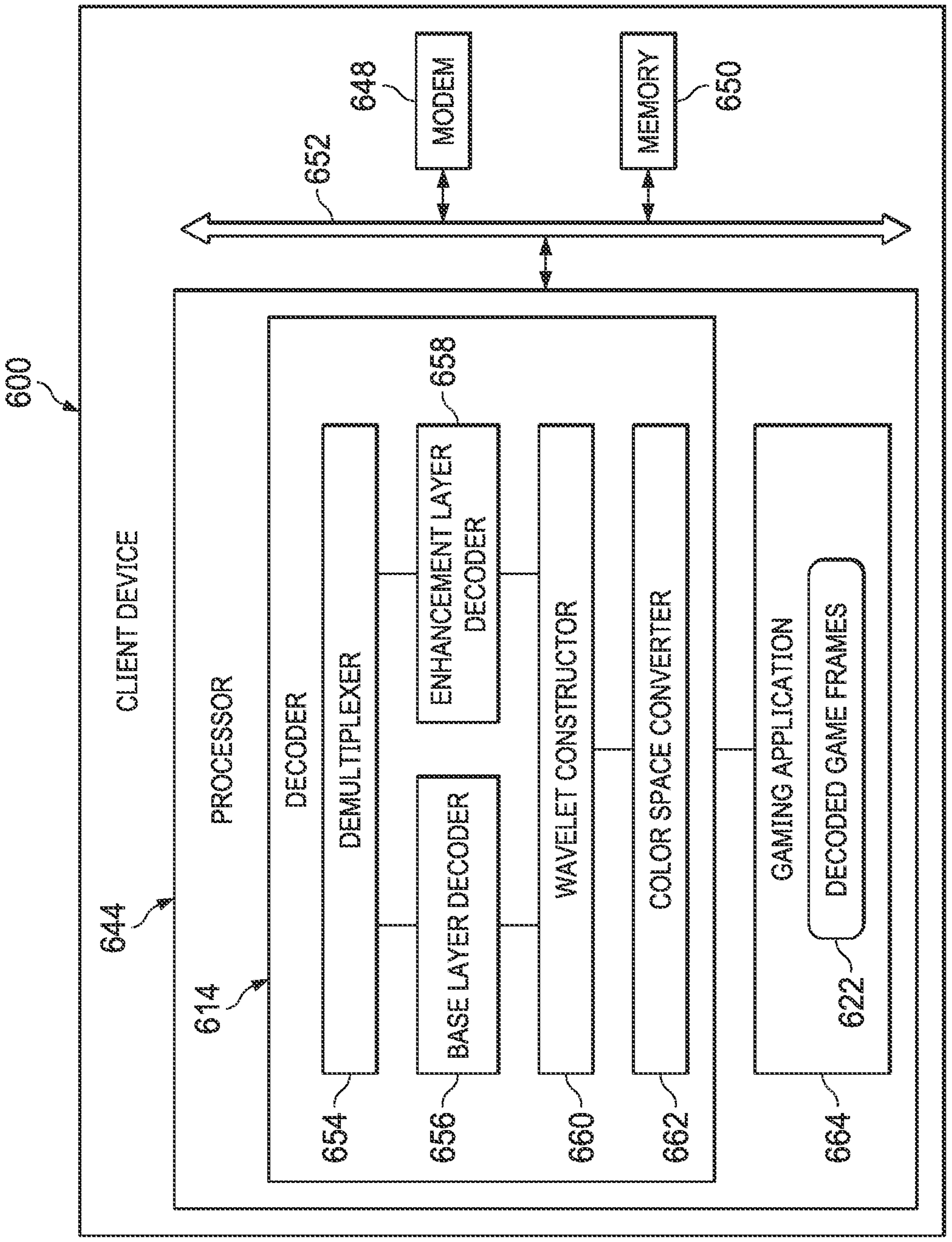
FIG. 6 is a block diagram of a client device configured to decode and run a gaming application within a cloud-based gaming system, in accordance with some embodiments.

Referring now to FIG. 6, a client device 600 configured to decode and display stream frames within a cloud-based gaming system is illustrated. In embodiments, client device 600 implements aspects of cloud-based gaming system 100 as described in FIG. 1. For example, client device 600 may be part of a client system 112 described in FIG. 1. Client device 600 includes one or more software and hardware components for bi-directional communications including components for decoding a game stream 108 such as to produce a set of decoded game frames 622. In some embodiments, client device 600 is part of an electronic device that supports decoding a gaming stream 108, including, for example, a desktop computer, a notebook computer, a smartphone, a handheld gaming device, a tablet, and a game console, to name a few. In embodiments, client device includes processor 644, modem 648, and memory 650. Memory 650 includes an electronic storage device, such as for example, a solid-state drive, a hard disk drive, RAM, ROM, EEPROM, optical storage device, or any combination thereof. Memory 650 includes instructions and data related to the operation of demultiplexer 654, base layer decoder 656, enhancement layer decoder 658, wavelet constructor 660, color space converter 662, and gaming application 664 such as, for example, codecs, coefficients, operations, reference frames, gaming engines, operating systems, constants, and the like. Modem 648 is configured to be communicatively coupled to one or more servers 102 via a network 110 and further configured to receive a game stream 108 from the one or more servers 102.

According to embodiments, processor 644, modem 648, and memory 650 are internally in electronic communication via one or more interfaces (e.g., a bus 652). According to embodiments, processor 644 includes one or more CPUs, microprocessors, FPGAs, GPUs, processing cores, or any combination thereof and is configured to decode and display gaming frames for use in a gaming application 664 associated with a client gaming session on cloud-based gaming system 100. In embodiments, processor 644 includes a decoder 614 capable of decoding one or more game frames from a game stream 108 encoded according to any of the processes and methods discussed above with reference to FIGS. 1-5. The decoder 614 includes, for example, demultiplexer 654, base layer decoder 656, enhancement layer decoder 658, wavelet constructor 660, and color space converter 662. A demultiplexer 654 is configured to receive a game stream 108 including a set of one or more encoded frames. For each encoded frame, demultiplexer 654 is configured to separate the encoded frame into a respective encoded base layer and respective encoded enhancement layer. The demultiplexer 654 provides the resulting encoded base layers and encoded enhancement layers to base layer decoder 656 and enhancement layer decoder 658, respectively.

According to embodiments, a base layer decoder 656 includes one or more hardware and software decoders configured to decode and decompress an encoded base layer to produce a decoded base layer. The base layer decoder 656 is configured to decode an encoded base layer according to one or more intraframe and interframe techniques and one or more codecs. As discussed above in FIGS. 1-5, the encoded base layer may be formed from the LL sub-band of a decomposed frame. The base layer decoder 656 is configured to provide a resulting decoded base layer to a wavelet constructor 660. Likewise, an enhancement layer decoder 658 includes one or more hardware and software decoders configured to decode and decompress an encoded enhancement layer to produce a decoded enhancement layer or decoded progressive stream (i.e., a decoded bitstream representing one or more refinements to the decoded base layer). According to embodiments, the enhancement layer decoder 658 includes a zeroblock-based decoder configured to determine one or more zero blocks within the encoded enhancement layer. From this determination, the zeroblock-based decoder is configured to only decompress the non-zero blocks of the encoded enhancement layer improving the decoding time for the encoded enhancement layer. According to embodiments, the base layer decoder 656 is distinct from the enhancement layer decoder 658 and is configured to operate concurrently with the enhancement layer decoder 658. The enhancement layer decoder 658 is configured to provide a resulting decoded enhancement layer or progressive stream to a wavelet constructor 660.

According to embodiments, the wavelet constructor 660 includes hardware and software configured to perform an inverse discrete waveform transform on the decoded base layer and decoded enhancement layer to produce a converted frame. According to embodiments, the wavelet constructor 660 is configured to perform an inverse discrete waveform transform that is the inverse function to the discrete waveform transform discussed above with reference to FIGS. 1-5. In embodiments, the wavelet constructor 660 performs an inverse discrete waveform transform on the decoded base layer and decoded enhancement layer resulting in a converted frame having a first color space such as, for example, YUV. According to embodiments, the wavelet constructor 660 provides a resulting converted frame to a color space converter 662. According to embodiments, each resulting converted frame has a first color space, or color model, such as, for example, RGB, BGR, GBR, YCbCr, YUV, HSV, HSL, LCh, and CMYK, to name a few. In embodiments, the color space converter 662 includes hardware and software configured to convert the color space, or color model, of the resulting converted frame from a first color space to a second, different color space thus producing a decoded game frame 622. As an example, the color space converter 662 is configured to convert a resulting converted frame from a YUV color space to a decoded game frame 622 having an RGB color space. The color space converter 224 includes such hardware and software as, for example, FPGAs, microcontrollers, ASICs, GPUs, and the like. Game application 664 receives each decoded game frame 622 associated with the current gaming session and is configured to manipulate, modify, and display the decoded game frames 622 on a display such as, for example, display 118.

Figure 7:
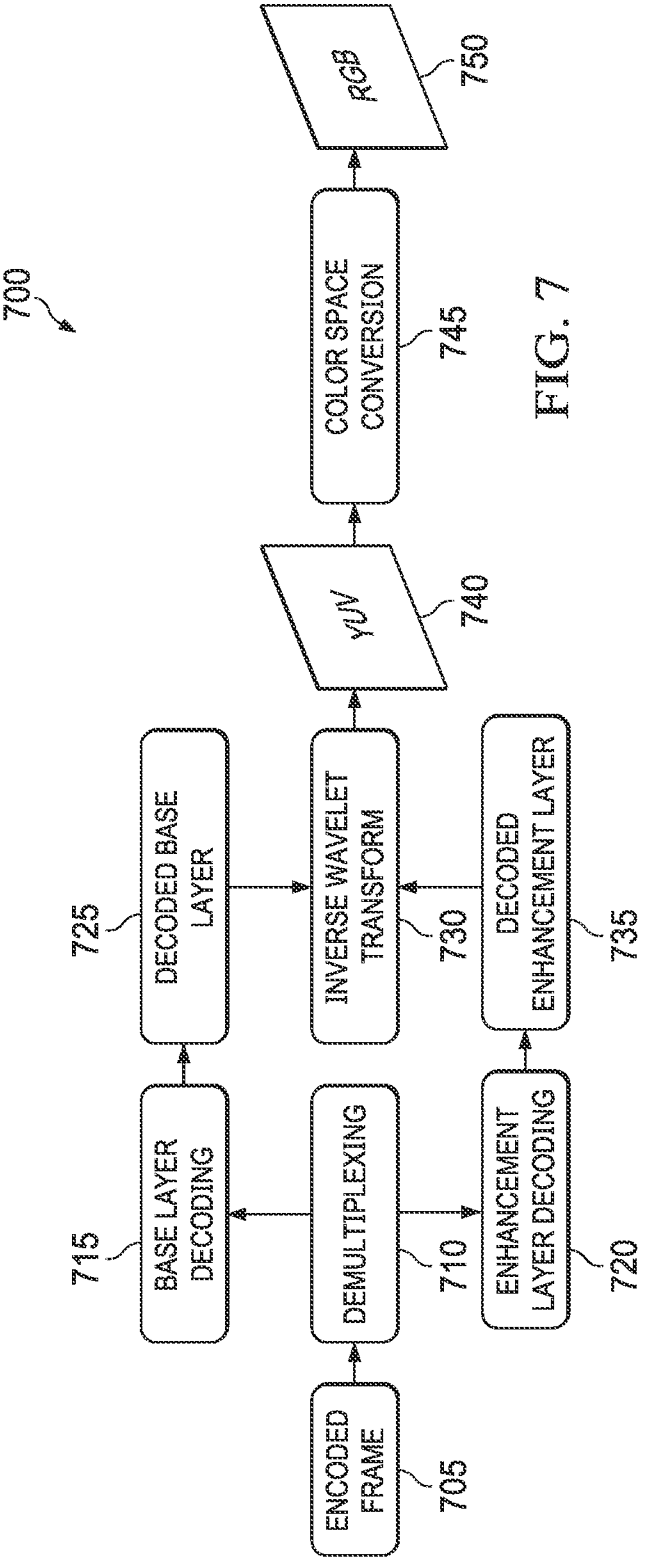
FIG. 7 is a flow diagram illustrating a method for a wavelet-driven decoding of an encoded frame, in accordance with some embodiments.

Referring now to FIG. 7, an example decoding operation 700 using an inverse discrete wavelet transform for a wavelet-driven decoding technique is presented. For ease of illustration, the decoding operation 700 is described with reference to the client device 600 of FIG. 6 implemented as part of a client system 112 in the cloud-based gaming system 100 of FIG. 1. In operation 700, client device 600 receives one or more game streams 108 each comprising one or more encoded frames 705 encoded by any process or method as discussed above with reference to FIGS. 2-5. The operation 700 includes a client device decoding these encoded frames 705 using an inverse discrete wavelet transform 730 and a color space conversion 745 to produce a decoded frame 750.

The decoding operation 700 includes demultiplexer 654 performing a demultiplexing operation 710 on each received encoded frame 705. The demultiplexing procedure includes separating the encoded base layer and the encoded enhancement layer from the encoded frame. The encoded base layer represents a basic quality level of the encoded frame 705 at a low bit rate and the encoded enhancement layer provides successive refinement to the detail of the encoded base layer. Also in the operation 700, the base layer decoder 656 performs a base layer decoding 715 on the resulting encoded base layer and the enhancement layer decoder 658 performs an enhancement layer decoding 720 on the resulting encoded enhancement layer. In embodiments, the decoding operation 700 includes the base layer decoder 656 executing the base layer decoding 715 and the enhancement layer decoder 658 executing the enhancement layer decoding 720 concurrently.

Base layer decoding 715 includes decoding a resulting encoded base layer according to one or more decompression techniques and one or more codecs to produce a decoded base layer. The decoded base layer includes one or more coefficients representing the brightness of one or more areas of the encoded frame. Likewise, enhancement layer decoding 720 includes decoding a resulting encoded enhancement layer according to one or more decompression techniques and one or more codecs to produce a decoded enhancement layer or decoded progressive stream. According to embodiments, enhancement layer decoding 720 includes a progressive zeroblock decoding operation. The progressive zeroblock decoding operation includes initializing a list of insignificant sets and a list of significant pixels. Initializing these sets includes populating the list of insignificant sets with the sub-bands forming the encoded enhancement layer such as, for example, one or more LH, HL, and HH sub-bands and emptying the list of significant pixels. The progressive zeroblock decoding operation further includes a significance load function on each set in the list of insignificant sets. The significance load function compares each set to a threshold value to determine if that set is significant. When a set is determined to be significant, it is then determined if that set represents a pixel of the encoded frame 705 or a block (i.e., one or more pixels) of the encoded frame 705. In response to the set representing a pixel, that set is added to the list of significant pixels. In response to the set representing a block, the set is partitioned into one or more subsets and each of the one or more subsets is then compared to the threshold value to determine significance. After each set has been sorted by significance, the progressive zeroblock decoding operation includes decompressing the data in the list of significant pixels. By only decoding the sets in the list of significant pixels, the decoding time for the encoded frame is reduced.

The decoding operation 700 further includes wavelet constructor 660 performing an inverse discrete wavelet transform 730 on the resulting decoded base layer and enhancement layers. According to embodiments, the inverse discrete wavelet transform 730 is the inverse function for any discrete wavelet transform discussed above with reference to FIGS. 2-5. The inverse discrete wavelet transform 730 includes combining the decoded base layer and enhancement layer into a converted frame 740 having a first color space. In the decoding operation 700, the color space converter 662 performs a color space conversion 745 on the resulting converted frame 740. The color space conversion 745 includes converting the first color space of the converted frame 740 to a second, different color space producing decoded frame 750. For example, color space conversion 745 includes converting the first color space of the converted frame 740, such as YUV, to a second, different color space, such as RGB, to produce decoded frame 750. The resulting decoded frame 750 represents at least a portion of a virtual environment associated with the gaming session and gaming application 664 running on the client device 600.

Figure 8:
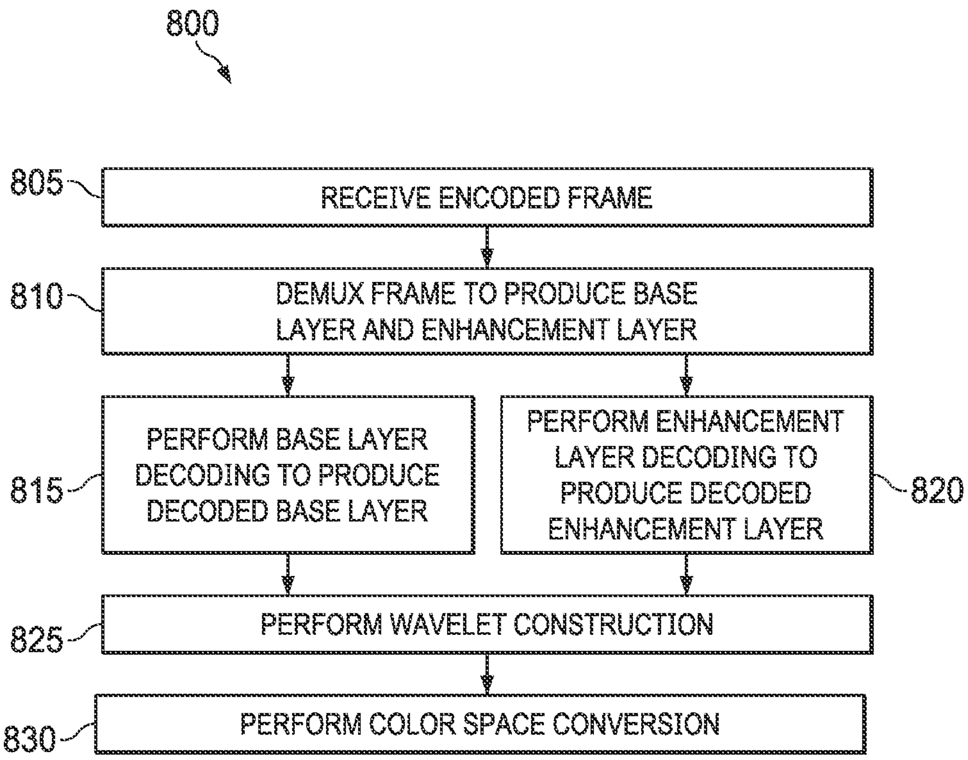
FIG. 8 is a diagram illustrating an example wavelet-driven decoding process, in accordance with some embodiments.

Referring now to FIG. 8, a method 800 for wavelet-driven is presented. For ease of illustration, the method 800 is described with reference to the client device 600 of FIG. 6 implemented as part of a client system 112 of the system 100 of FIG. 1. At block 805, client device 600 receives a gaming stream 108 including one or more encoded frames. Each of the encoded frames includes encoded data representing at least a portion of a virtual environment associated with the current gaming session of the client device 600. At block 810, demultiplexer 654 performs a demultiplexing operation on a first encoded frame of the gaming stream 108. The demultiplexing operation includes separating the first encoded frame into an encoded base layer and an encoded enhancement layer. At block 815, a base layer decoder 656 performs a base layer decoding on the resulting encoded base layer. The base layer decoding includes decompressing the data in the encoded base layer according to one or more codecs to produce a decoded base layer. Likewise, at block 820, an enhancement layer decoder 658 performs an enhancement layer decoding on the encoded enhancement layer to produce a decoded enhancement layer. The enhancement layer decoding operation includes performing a progressive zeroblock decoding process on the enhancement layer such as by sorting sets of the encoded enhancement layer by significance. According to embodiments, in method 800, blocks 815 and 820 occur concurrently. At block 825, wavelet constructor 660 performs an inverse wavelet transform, or wavelet construction, on the resulting decoded base layer and decoded enhancement layer. The inverse wavelet transform includes combining the resulting decoded base layer and decoded enhancement layer into a converted frame having a first color space. At block 830, color space converter 662 converts the first color space of the resulting converted frame to a second, different color space so as to produce the decoded frame. Client device 600 then displays the decoded frame on one or more displays.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:

decomposing a first frame into a base layer of the first frame and an enhancement layer of the first frame;

encoding the base layer at a target base layer bitrate based on a target bitrate to produce an encoded base layer;

generating a progressive stream from the enhancement layer;

truncating the progressive stream based on the target bitrate to produce a truncated progressive stream; and combining the encoded base layer with the truncated progressive stream to produce an encoded first frame.

2. The method of claim 1, wherein the method further comprises:

determining a sum of a size of the encoded base layer and a size of the progressive stream; and comparing the sum to a ratio of the target bitrate to a frame rate of the first frame.

3. The method of claim 2, further comprising truncating the progressive stream in response to the sum being greater than the ratio.

4. The method of claim 1, wherein generating the progressive stream as a function of the enhancement layer comprises encoding the enhancement layer by a zeroblock-based encoder.

5. The method of claim 4, wherein encoding the enhancement layer comprises:

the zeroblock-based encoder determining one or more zeroblocks in the enhancement layer by sorting coefficients of the enhancement layer by significance into sets of a first type of coefficients and a second type of coefficients and flagging blocks with coefficients of the second type as zero blocks; and compressing the zero blocks so that quantized coefficients of encoded zero blocks are all zero.

6. The method of claim 1, wherein decomposing the first frame into the base layer of the first frame and the enhancement layer of the first frame comprises:

applying a discrete wavelet transform to the first frame.

7. The method of claim 6, wherein applying the discrete wavelet transform to the first frame comprises:

decomposing the first frame into a plurality of sub-bands, wherein a first subset of the plurality of sub-bands forms the base layer of the first frame and a second subset of the plurality of sub-bands forms the enhancement layer of the first frame.

8. The method of claim 7, wherein the first subset of the plurality of sub-bands includes at least one first sub-band defined by a first lower boundary and second upper boundary and the second subset of the plurality of sub-bands includes two or more different partial sub-bands in each case differing from and being higher than boundaries of the first sub-band.

9. The method of claim 8, wherein the first subset of the plurality of sub-bands includes at least a low-low sub-band and the second subset of the plurality of sub-bands includes at least a low-high sub-band, high-low sub-band, and high-high sub-band.

10. A method, comprising:

receiving a first frame of a set of frames;

decomposing the first frame into a plurality of sub-bands, wherein the plurality of sub-bands comprises a base layer and an enhancement layer;

encoding the base layer at a base layer target bitrate based on a target bitrate so as to produce an encoded base layer;

encoding the enhancement layer so as to produce an encoded enhancement layer;

comparing a sum of the encoded base layer and the encoded enhancement layer to a ratio of a target bitrate to a framerate of the set of frames;

in response to the sum being greater than the ratio, truncating the encoded enhancement layer; and combining the encoded base layer with the truncated encoded enhancement layer so as to produce an encoded first frame.

11. The method of claim 10, wherein the enhancement layer is encoded by a zeroblock-based encoder.

12. The method of claim 11, wherein encoding the enhancement layer comprises:

the zeroblock-based encoder determining one or more zeroblocks in the enhancement layer by sorting coefficients of the enhancement layer by significance into sets of a first type of coefficients and a second type of coefficients and flagging blocks with coefficients of the second type as zero blocks; and compressing the zero blocks so that quantized coefficients of encoded zero blocks are all zero.

13. The method of claim 10, wherein the plurality of sub-bands includes at least a first subset including at least one first sub-band defined by a first lower boundary and second upper boundary and a second subset including two or more different partial sub-bands in each case differing from and being higher than boundaries of the first sub-band.

14. The method of claim 13, wherein the plurality of sub-bands includes at least a low-low sub-band, low-high sub-band, high-low sub-band, and high-high sub-band.

15. The method of claim 14, wherein the low-low sub-band forms the base layer and wherein the low-high, high-low, and high-high sub-bands form the enhancement layer.

16. The method of claim 10, wherein decomposing the first frame into a plurality of sub-bands comprises:

applying a discrete wavelet transform to the first frame.

17. The method of claim 10, wherein encoding the enhancement layer comprises:

performing a zeroblock-based encoding on the enhancement layer.

18. The method of claim 1, wherein the enhancement layer comprises data relating to one or more of horizontal edges, vertical edges, or diagonal edges of the first frame.

19. The method of claim 1, further comprising:

determining the target bitrate according to at least one of: a variable-bitrate-control scheme or a constant-bitrate-control scheme.

20. A system comprising:

one or more processors; and a memory coupled to the one or more processors and storing executable instructions configured to manipulate the one or more processors to perform a method comprising decomposing a first frame into a base layer of the first frame and an enhancement layer of the first frame;

encoding the base layer at a target base layer bitrate based on a target bitrate to produce an encoded base layer;

generating a progressive stream from the enhancement layer;

truncating the progressive stream based on the target bitrate produce a truncated progressive stream; and combining the encoded base layer with the truncated progressive stream to produce an encoded first frame.

21. The system of claim 20, wherein the method further comprises:

determining a sum of a size of the encoded base layer and a size of the progressive stream; and comparing the sum to a ratio of the target bitrate to a frame rate of the first frame.

22. The system of claim 20, wherein generating the progressive stream as a function of the enhancement layer comprises encoding the enhancement layer by a zeroblock-based encoder of the system.

23. The system of claim 22, wherein encoding the enhancement layer comprises:

operating the zeroblock-based encoder to determine one or more zeroblocks in the enhancement layer by sorting coefficients of the enhancement layer by significance into sets of a first type of coefficients and a second type of coefficients and flagging blocks with coefficients of the second type as zero blocks; and compressing the zero blocks so that quantized coefficients of encoded zero blocks are all zero.

24. The system of claim 20, wherein decomposing the first frame into the base layer of the first frame and the enhancement layer of the first frame comprises applying a discrete wavelet transform to the first frame.

* * * * *